Aug. 8, 1933.                A. OTTO                 1,921,579
                        TIRE FORMING DEVICE
                       Filed Sept. 26, 1930

INVENTOR.
ALBERT OTTO
BY
ATTORNEYS.

Patented Aug. 8, 1933

1,921,579

UNITED STATES PATENT OFFICE 1,921,579

TIRE FORMING DEVICE

Albert Otto, Grosse Pointe Park, Mich., assignor to Morgan & Wright, Detroit, Mich., a Corporation of Michigan Application September 26, 1930
Serial No. 484,491

6 Claims. (Cl. 154—9)

My invention relates to tire forming devices, and more particularly to apparatus for applying beads to plies of fabric and rubber while on a revolving shaper.

A common form of apparatus for applying bead wires to partially shaped tires is a ring, turned down on its outer periphery along the edge facing the tire material so as to form a shoulder upon which a bead wire is placed. Ordinarily the shoulder so formed is narrower than the width or diameter of the bead wire which is carried thereon. The resultant overhang of the bead wire is necessary in order to insure the proper contact between the bead wire and the fabric of the tire carcass when it is desired to transfer the bead wire to the fabric. The positioning of a bead wire upon such a narrow shoulder has required the exercise of considerable care on the part of an operator.

I provide a bead mounting device in which a bead supporting shoulder is formed by an edge of an annular rim against which the bead wire bears and an internal relatively movable ring which engages the inner peripheral surface of the bead ring. The width of the projecting portion of the inner movable ring may be substantially equal to the width or diameter of the bead ring so that the bead ring is easily mounted thereon.

When it is desired to apply the bead ring to a tire carcass, the rim and ring are simultaneously advanced toward a revolving tire shaping drum or core. Upon the engagement of the ring with either the drum or fabric carried thereby, the ring moves axially relative to the rim against spring pressure. Meanwhile the rim continues to advance to cause the transfer of the bead ring to the tire carcass. Upon the withdrawal of the bead mounting device the ring is again projected outwardly of the rim for reception of a new bead ring.

Figure 1:
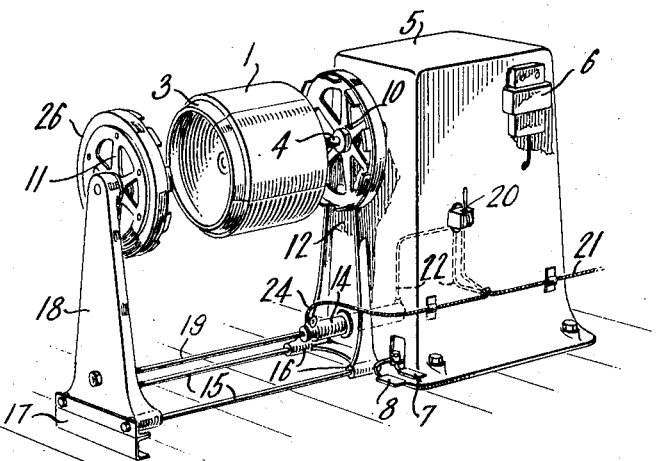
Figure 2:
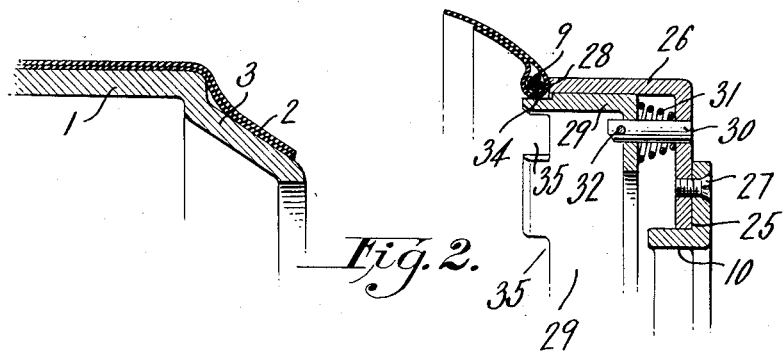
Figure 3:
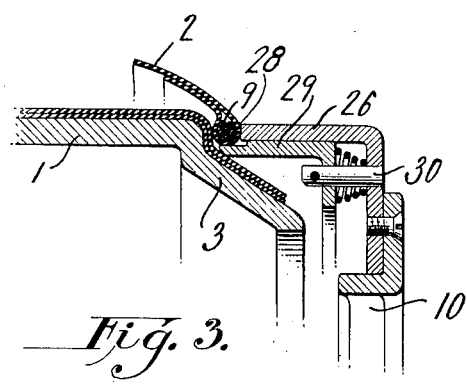

The accompanying drawing illustrates a present preferred embodiment of the invention, in which Figure 1 is a perspective view of a tire shaping mechanism embodying the bead mounting device of the present invention;

Fig. 2 is a sectional view of a portion of a tire shaping drum showing the bead mounting device in its inactive position; and Fig. 3 is a view of the parts shown in Fig. 2 during a bead transferring operation.

Referring to the drawing a collapsible rotatable drum 1 is provided for supporting and shaping a plurality of fabric and rubber plies 2 into the form of a "pulley band" which is subsequently shaped into a tire. The edges of the drum 1 are provided with inwardly extending shoulders 3 for the reception of the bead rings. It is to be understood that a tire building core may be substituted for the drum 1, if desired. The drum 1 is mounted on a shaft 4 which extends into a housing 5 for a driving motor, not shown. A control switch 6 for the motor is mounted on the housing 5. Treadles 7 and 8 are provided for controlling the rotation of the drum by the foot of an operator.

A bead mounting device for applying bead rings 9 of wire and enclosing fabric comprises a pair of rotatable hubs 10 and 11 which are co-axially mounted with respect to the drum 1. The hub 10 is moved longitudinally of the shaft 4 by a standard 12. The hub 10 is preferably freely rotatable relative to the shaft 4 which extends therethrough. The standard 12 is secured to a cylinder 14 and is slidably supported by guide rods 15 extending through bosses 16 at its base. The guide rods 15 extend between a clamping bracket 17 and the housing 5.

The hub 11 is supported by a standard 18 which also is slidable along the rods 15. A piston 19 entering the cylinder 14 is connected to the standard 18 so that upon the admission of fluid under pressure to the cylinder 14 the standards may be drawn towards or away from each other for bringing the bead rings against the drum 1, or for removing them from engagement with the drum. The admission of fluid under pressure to the cylinder 14 is controlled by a valve 20 which is connected to a supply line 21 and to the opposite ends of the cylinder 14 by pipe lines 22 and 24.

As the details of the hubs 10 and 11 and the elements carried thereby are similar, except that they are both mounted to face the drum 1, a detailed description of one only is given.

Referring to Figs. 2 and 3, the hub 10 terminates in an annular channel 25 to which a rim 26 of L shape is secured by screws 27. The leg of the rim which is parallel to the axis of the hub is directed toward the drum 1 so that its outer end 28 may engage the side of a bead ring 9. A ring 29 is mounted internally of the rim 26 and is supported by pins 30 projecting from the vertical walls of the rim 26. Springs 31 are disposed about the pins 30 and abut the vertical walls of the rim 26 and the ring 29. Cotter pins 32 are inserted in the pins 30 for retaining the ring 29 in place. While Figs. 2 and 3 show the details of but one pin and spring it is to be understood that a suitable number of such assemblies are applied about the periphery of the ring 29.

The outer edge of the ring 29 is cut away to provide a peripheral shoulder 34. The bead ring 9 is supported on the shoulder 34 and bears against the end 28 of the rim when the bead mounting device is in an inactive position. The outer edge of the ring 29 may be provided with notches 35 for the convenience of the operator in mounting the bead ring.

When it is desired to apply bead rings to the drum 1, the operator manipulates the valve 20 to cause fluid to traverse the pipe line 24 and enter the cylinder 14. Relative movement between the cylinder 14 and the piston rod 19 causes the standards 14 and 18 to approach each other and the drum 1.

When the forward edge of the ring 29 engages the fabric 2 on the drum 1, as shown in Fig. 3, the ring moves axially of the hub against the compression of the several springs 31. However, the edge 28 of the rim 26 continues to advance to press the bead ring 9 against the fabric 2. During this transfer the hubs 10 and 11 rotate with the drum 1. The operator, by the assistance of suitable tools, transfers the bead rings 9 to the drum. The relative movement between each rim 26 and ring 29 provides the necessary overhang of the bead ring associated therewith to provide the desired contact between the fabric 2 and the bead ring 9.

After the bead rings carried by the hubs 10 and 11 have been transferred to the drum 1, the operator manipulates the valve 20 to supply fluid under pressure to the cylinder 14 through the pipe line 22, at the same time permitting the escape of fluid through the pipe line 24. The standards 12 and 18 are then separated from the drum 1. Upon the withdrawal of the hubs the ring 29 carried by each advances relative to the rim 26 by the expansion of the springs 31. Seats for subsequent bead rings are provided by the shoulders 34 and edges 28.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A bead mounting device comprising a member for engaging the side of a bead ring and a relatively movable supporting element for engaging the inner periphery of the bead ring, and resilient means connecting said bead ring engaging member and supporting element.

2. A bead mounting device comprising a member for engaging the side of a bead ring and a relatively movable supporting element projecting beyond said member for engaging the inner periphery of the bead ring, and spaced recesses around the projecting portion of said supporting element for facilitating the application of a bead ring to said device.

3. A bead mounting device comprising a member for engaging the side of a bead ring and a relatively movable supporting element for engaging the inner periphery of the bead ring, annular flanges carried by said bead ring engaging member and supporting element said flanges being spaced from each other, and resilient means mounted between said flanges for maintaining said bead ring engaging member and supporting element in normal bead supporting relation.

4. A tire building apparatus comprising in combination a flat band building drum having an inclined peripheral flange at one end, and a bead mounting device adapted to contact said flange comprising a member for engaging a side of a bead ring and a relatively movable member for engaging the inner periphery of the ring.

5. A tire building apparatus comprising in combination a flat band building drum having an inclined peripheral flange at one end, a bead mounting device comprising a member for engaging a side of a bead ring and a relatively movable supporting element for engaging the inner periphery of the bead ring, said supporting element being adapted to be pushed out of engagement with the inner periphery of the bead ring by contact with the said inclined flange of the building drum.

6. In a tire building machine, a tire building core having peripheral shoulders at opposite ends thereof upon which the bead ring receiving portions of a tire casing are formed, a supporting member having an annular bear ring seat mounted coaxially with the core and movable axially toward and away from an end of the core, an annular pressure applying member engageable with the outer side of a bead ring on said seat, means for moving said supporting member axially to position the bead ring against the portion of a tire casing overlying a shoulder of the core and for actuating said pressure applying member to press the bead ring against the shoulder of the core.

ALBERT OTTO.